US006942141B2

(12) United States Patent
Swift

(10) Patent No.: US 6,942,141 B2
(45) Date of Patent: Sep. 13, 2005

(54) SECURE DELIVERY APPARATUS

(75) Inventor: Nicholas Swift, London (GB)

(73) Assignee: Warrant Trustees Limited References TC.0754, Jersey (GB)

( * ) Notice: Subject to any disclaimer, the term of this patent is extended or adjusted under 35 U.S.C. 154(b) by 47 days.

(21) Appl. No.: 10/470,876

(22) PCT Filed: Sep. 24, 2001

(86) PCT No.: PCT/GB01/04256

§ 371 (c)(1), (2), (4) Date: Jul. 31, 2003

(87) PCT Pub. No.: WO02/067735

PCT Pub. Date: Sep. 6, 2002

(65) Prior Publication Data

US 2004/0217157 A1 Nov. 4, 2004

(30) Foreign Application Priority Data

Feb. 26, 2001 (GB) ............................................ 0104711

(51) Int. Cl.[7] ................................................ B65G 11/04
(52) U.S. Cl. ............................................ 232/47; 232/45
(58) Field of Search ............................. 232/45, 17, 47, 232/20, 21, 27, 32; 220/502, 529

(56) References Cited

U.S. PATENT DOCUMENTS 292,069 A * 1/1884 Teller .......................... 232/32
400,026 A * 3/1889 Wicek ......................... 232/32
811,611 A * 2/1906 Aresenault ................... 232/32
2,924,377 A * 2/1960 Lewis ....................... 232/43.2
4,944,419 A * 7/1990 Chandler .................... 220/502
6,568,555 B1 * 5/2003 LoCascio ............... 220/495.07
6,644,543 B2 * 11/2003 Cox et al. ...................... 232/47

FOREIGN PATENT DOCUMENTS

DE 227709 * 10/1910
DE 501753 * 7/1930
DE 1144644 * 2/1963
EP 0919167 * 6/1999
FR 1044814 * 11/1953

* cited by examiner

*Primary Examiner*—William L. Miller
(74) *Attorney, Agent, or Firm*—Thomas M. Freiburger

(57) ABSTRACT

Security apparatus (10) for the secure receipt and retention of articles (30) delivered thereto. The security apparatus (10) comprises a housing (12) having an upper chamber (14) and a lower chamber (16) separated from one another by a movable partition (15). The upper chamber (14) has an entrance opening (18) for the passage therethrough of a product (30) to be delivered to the apparatus (10) and a pivoted closure member (20) for said entrance opening (18). The movable partition (15) is slidable inwardly and outwardly of the apparatus (10) between respectively a closing position in which it separates the upper and lower chambers (14,16) from one another and an open position in which it permits inter-communication between the upper and lower chambers (14,16). Interaction means (25) are provided between the partition (15) and said closure member (20) whereby the closure member (20) can only be moved to open said entrance opening (18) when the partition (15) is in said closing position.

15 Claims, 3 Drawing Sheets

SECURE DELIVERY APPARATUS

This application is a 371 of PCT/GB01/04256, filed Sep. 24, 2001.

TECHNICAL FIELD

This invention relates to apparatus which permits delivery of an article into the apparatus and for the article's secure retention in the apparatus.

BACKGROUND ART

Increasingly nowadays people buy products remotely, e.g. by telephone or via the Internet, for delivery to their homes by the seller or his agent. Frequently, the purchaser is away from home at the time of delivery and the product cannot be left in a secure location. Various proposals have been made to deal with this problem. One such proposal provides a container having a door openable solely by a coded electrical signal input from a key touch pad, the appropriate code being sent, e.g. by mobile phone, to delivery personnel authorised by the intended recipient of the delivery. An example of such an arrangement is that known as "BearBox" promoted on the Internet site: bearbox.com. Such an arrangement has the disadvantages (a) of permitting a subsequent delivery-man access to a previously delivered item and (b) the difficulty of providing codes to delivery personnel.

To overcome these disadvantages other past proposals provide a container divided into first and second compartments, the delivered item being placed in the first compartment and moved therefrom to the second compartment when or after the door to the first compartment is closed. To provide security, restriction means is provided to prevent access to the second compartment when the door to the first compartment is opened. One such restriction means comprises an attachment to the door of the first compartment which moves to block access to the second compartment when the door to the first compartment is opened. Another such restriction means comprises a hinged flap or partition that tilts after the item has been delivered, e.g. the arrangement known as "dVault" promoted on the Internet site: dvault.net.

To allow for operation of such restriction means the overall size of the container must be very much larger than the maximum size of article to be delivered. For example with the secure delivery apparatus described in GB-2242481, it is estimated that the container must be approximately twice the depth and three times the height of the largest item that can be delivered into it. This dimensional disadvantage appears also to apply to the prior art arrangement disclosed for example in EP-0576311. Other disadvantages, including unduly complex mechanisms for moving the delivered item from the first or delivery compartment to the second or storage compartment are disclosed in GB-2204914 and GB-2262132.

SUMMARY OF THE INVENTION

With a view to obviating—or at least reducing—the above-mentioned and/or other disadvantages of prior art arrangements, the present invention envisages the provision of security apparatus for the secure receipt and retention of articles delivered thereto, said security apparatus comprising a housing having an upper chamber and a lower chamber separated from one another by a movable partition, characterised in that the upper chamber has an entrance opening for the passage therethrough of a product to be delivered to the apparatus and a pivoted closure member for said entrance opening, said movable partition is slidable inwardly and outwardly of the apparatus between respectively a closing position in which it separates the upper and lower chambers from one another and an open position in which it permits inter-communication between the upper and lower chambers, and in that interaction means are provided between the partition and said closure member whereby the closure member can only be moved to open said entrance opening when the partition is in said closing position.

Preferably, said interaction means comprises at least one protuberance extending at an angle from the closure member, and at least one opening in the partition engaged by said at least one protuberance. Advantageously said interaction means may comprise a pair of protuberances and a pair of partition openings spaced apart and adjacent opposite sides of the apparatus.

The apparatus comprises a lockable door through which the delivered product or products can be removed from the apparatus. The door may be unlockable by a key or by an alpha and/or numeric code operable directly on the door or on a padlock securing the door and a doorframe portion of the apparatus. The said door is preferably located below the entrance opening. Alternatively, said door may be located in a side of the apparatus or opposite the entrance opening and, in such an alternative location, the door may have a height permitting access, when the door is open, to both upper and lower chambers.

BRIEF DESCRIPTION OF THE DRAWINGS

By way of example, apparatus embodying this invention will now be described with reference to the accompanying drawings of which.

DETAILED DESCRIPTION OF EXAMPLE(S) OF THE INVENTION

Figure 1:
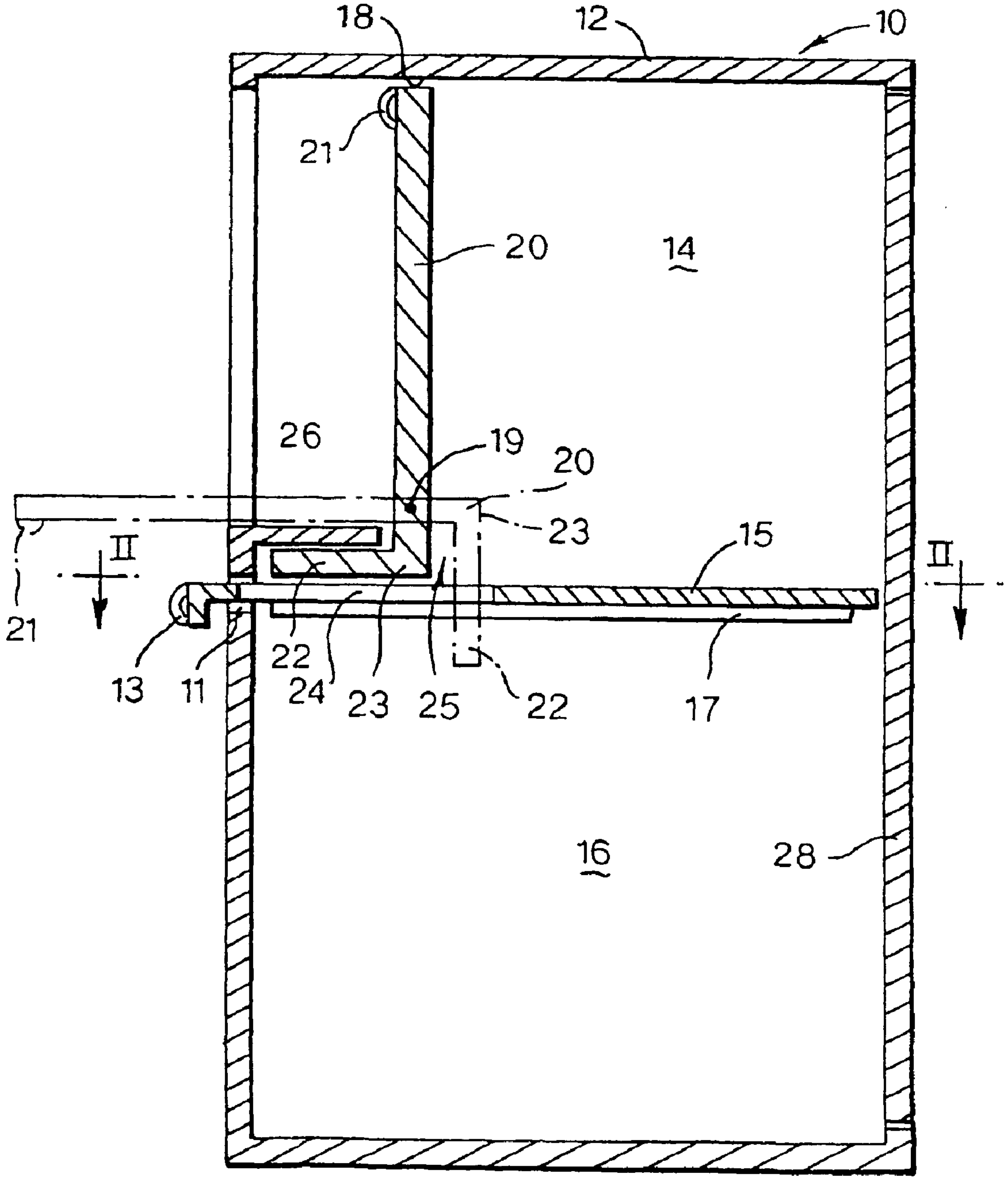
FIG. 1 is a schematic vertical section through security apparatus in one embodiment of this invention.
Figure 2:
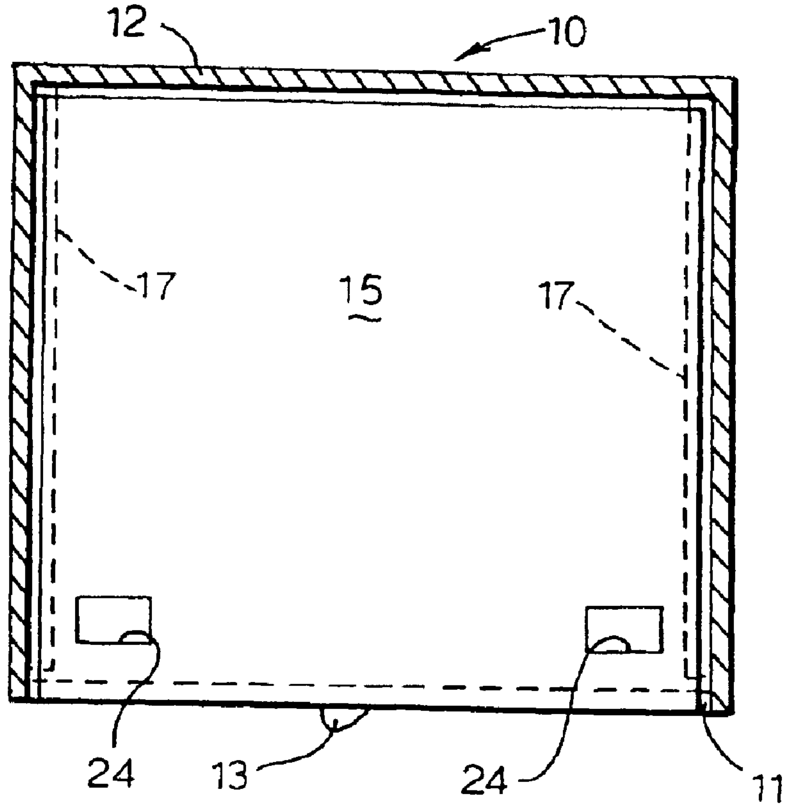
FIG. 2 is a horizontal sectional view along the line II—II of FIG. 1, FIGS. 3 4 5 and 6 are similar diagrammatic views of the apparatus of FIG. 1 in sequential stages of use.

The illustrated security apparatus 10 is for the secure receipt and retention of articles such as 30 (FIGS. 4–6) delivered thereto, e.g. by a postman, courier or a delivery company's personnel. As shown, the security apparatus 10 comprises a housing 12 of generally parallelepiped form. The housing 12 has an upper chamber 14 and a lower chamber 16 separated from one another by a movable partition 15. The upper chamber 14 has an entrance opening 18 for the passage therethrough of a product or article 30 to be delivered to the apparatus. A closure member 20 for said entrance opening 18 is pivoted to the inside side walls of the housing 12, the pivot axis being designated 19 in the drawings. Pivotal opening of closure member 20 is effected manually by pulling on a handle 21 located adjacent the upper free end of the closure member 20 (when in its upright 'closing' condition). Closing of closure member 20 may be likewise effected manually or, as is preferred, automatically by spring means (not shown) acting to close the closure member 20 when manual operation is released.

The movable partition 15 is supported by lateral guide rails 17 and is slidable along them inwardly and outwardly of the apparatus 10 through a front slot 11 and between respectively a closing position (FIGS. 1–5) in which it separates the upper and lower chambers 14,16 from one another, and an open position (FIG. 6) in which it permits inter-communication between the upper and lower chambers 14,16. Sliding motion is effected by manual action on a handle 13 attached to the forward edge of the partition 15. A stop member 27 (FIGS. 3–6) depends from the rear of partition 15 to define, by engagement of the front wall of the apparatus, an end limit to outward sliding motion of the partition 15 and restrain the partition from total withdrawal from the apparatus (see FIG. 6).

The apparatus comprises interaction means 25 between the partition 15 and the closure member 20 whereby the closure member 20 can only be moved to open said entrance opening 18 when the partition is in said closing position (of FIGS. 1–5).

To provide the interaction means 25 of this embodiment, a pair of right-angled extensions 22 protrude in the form of lips from the lower edge 23 of the closure member 20—one adjacent each side edge of the closure member 20—and, at corresponding locations, a pair of openings 24 are provided in the partition 15 which receive the protruding extensions 22 of closure member 20 when the latter is pivoted (about pivot axis 19) to open the entrance opening 18 to upper chamber 14. The engagement of the openings 24 by the protruding extensions or lips 22 of the closure member 20, prevent sliding motion of the partition 15 outwardly of the housing 12. In other words, when the entrance opening 18 is rendered accessible for the passage therethrough of an item 30 being delivered, the partition 15 remains in its closing position in which it separates the upper and lower chambers 14,16 from one another.

The apparatus 10 comprises a pair of cover plates 26 to overlie the openings 24 and the protruding extensions 22 of closure member 20 when the latter is in its upright position and closing the entrance opening 18 to upper chamber 14. Optionally, in a modified construction, the pair of cover plates 26 may be coalesced into a single elongate plate extending from side-to-side of the entrance opening 18. The cover plate(s) 26 also serve(s) to hinder access—via the openings 24—to the protruding extensions 22 by thieves or vandals wishing to damage the apparatus 10.

The illustrated apparatus 10 also comprises a lockable door 28 through which the delivered product or products can be removed from the apparatus. The door 28 may be unlockable by a key or by an alpha and/or numeric code operable directly on the door or on a padlock securing the door and a doorframe portion of the apparatus. The door 28 is preferably located in the front wall of housing 12 below the sliding partition 15 and the entrance opening 18. Alternatively, door 28 may be located in a side of the apparatus or (as shown in FIG. 1) opposite the entrance opening 19. In such an alternative location, the door 28 may have a height permitting access, when the door is open, to both upper and lower chambers 14,16.

It will be appreciated that providing the door 28 in the front wall of housing 12 allows the apparatus 10 to be 'built in' to a cavity therefore in a brick or concrete wall and secured to such wall by the back or a side of the apparatus 10.

It will also be appreciated that the by providing the door 28 (whatever its location) with a code-operable lock or padlock allows an article (e.g. a faulty product to be returned to its supplier or manufacturer) to be collected from the lower compartment 16 by a collector authorised to remove the article and to whom the code for the lock or padlock has been previously given.

It will be noted that the illustrated apparatus of this embodiment provides no 'space invading' inward extensions of the closure member 20, of the partition 15 or of the door 28 and accordingly the volume available for occupation by delivered articles is maximised.

Figure 3:
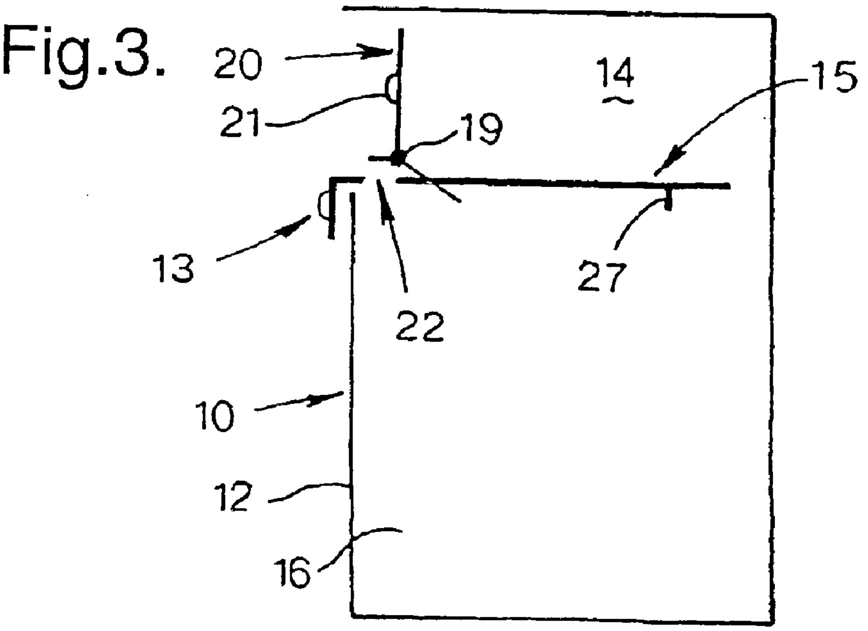
Figure 6:
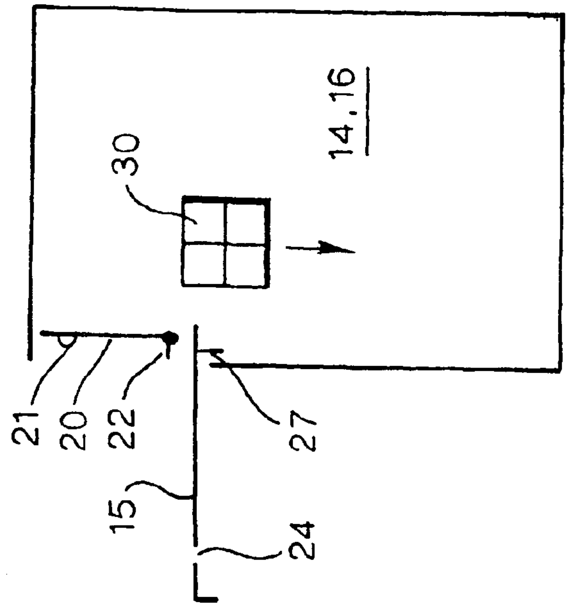
Figure 5:
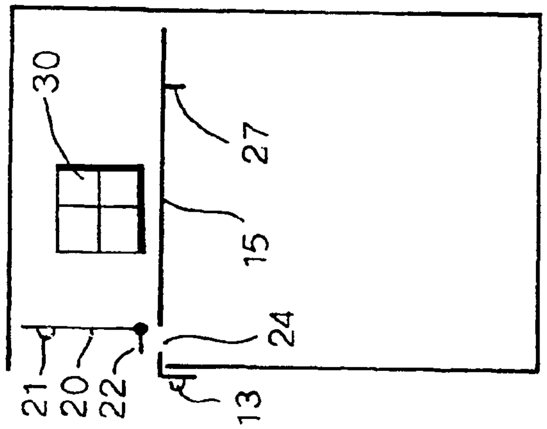
Figure 4:
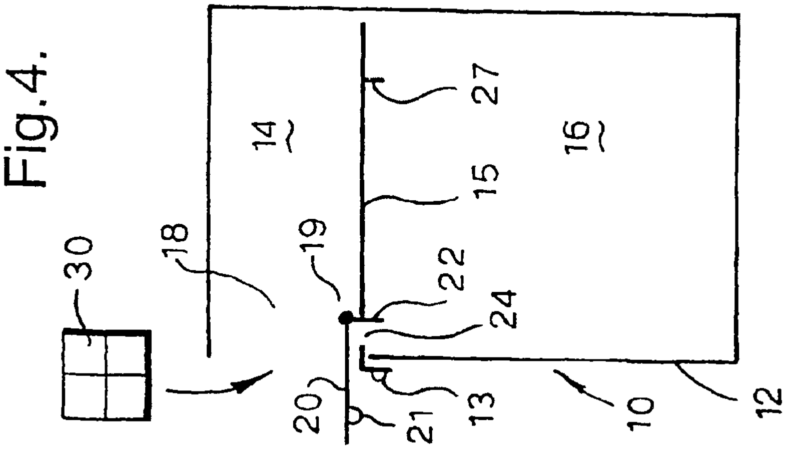

The stages of the delivery process is apparent from FIGS. 3–6. In FIG. 3, the apparatus 10 is closed and empty of delivered articles. FIG. 4 illustrates the arrival of an article 30 for delivery, the closure member 20 being pivoted downwardly to open the entrance opening 18 and permit passage therethrough of the article 30 into the upper chamber 14 whilst the lowered position of closure member 20 locks the sliding partition 15 in position—in which it separates compartments 14,16 from one another. FIG. 5 illustrates delivered article 30 within the upper chamber 14 and the closure member 20 closing the entrance opening 18 and disengaging parts 22,24 to unlock the partition and permit of its sliding action. Such sliding movement is illustrated in FIG. 6 whereby compartments 14,16 intercommunicate with one another and delivered article 30 falls freely under gravity into the bottom of lower chamber 16. The floor of chamber 16 may optionally be provided with a foam carpet or other cushioning means.

In one preferred form of this invention, the housing 12 is fabricated of steel or of strong plastics material to have a width of 520 mm, a depth of 550 mm, a total height of 900 mm, and a height for the entrance opening 18 of the order of 300 mm. However it is to be appreciated that the invention is not restricted to these particular dimensions which can each be varied considerably without departing from the intended scope of the present invention.

It will be apparent that the illustrated embodiment of the invention can be used for delivered items that are very large in relation to the overall size of the housing 12. For example, the storage compartment 16 can have a height as small as approximately one-half the total size of housing 12 (as compared with only one-third or one-quarter with some prior art arrangements). Furthermore, to accommodate articles that have an increased depth it only requires that the depth of the box be increased by a corresponding distance rather than by a proportionately increased distance.

In a modification, the sliding partition can slide in a sideways direction (inwardly and outwardly of a side slot) instead in a forwards and backwards direction (inwardly and outwardly of the front slot 11).

In another modification, the handle 21 is replaced by a finger hole in the closure member 20 and/or the handle 23 is replaced by a finger hole in the partition 15.

Other modifications and embodiments of the invention, which will be readily apparent to those skilled in this art, are to be deemed within the ambit and scope of the invention, and the particular embodiment(s) hereinbefore described may be varied in construction and detail, e.g. interchanging (where appropriate or desired) different features of each, without departing from the scope of the patent monopoly hereby sought.

What is claimed is:

1. Security apparatus (10) for the secure receipt and retention of articles (30) delivered thereto, said security apparatus (10) comprising a housing (12) having a plurality of upstanding sides at angles to one another, the housing being separated into an upper chamber (14) and a lower chamber (16) by a movable partition (15), characterised in that an entrance opening (18) is provided in one of said upstanding sides to the upper chamber (14) for permitting the horizontal passage therethrough of a product (30) to be delivered to the apparatus (10), a pivoted closure member (20) is provided for said entrance opening (18), said movable partition (15) is slidable inwardly and outwardly of the apparatus (10) between respectively a closing position in which it separates the upper and lower chambers (14,16) from one another and an open position in which it permits intercommunication between the upper and lower chambers (14,16), and in that interaction means (25) are provided between the partition (15) and said closure member (20) whereby the closure member (20) can only be moved to open said entrance opening (18) when the partition (15) is in said closing position.

2. Security apparatus according to claim 1, characterised in that said interaction means (25) comprises at least one protuberance (22) extending at an angle from the closure member (20), and at least one opening (24) in the partition (15) engaged by said at least one protuberance (22).

3. Security apparatus according to claim 2, characterized in that said interaction means (25) comprises a pair of protuberances (22) and a pair of partition openings (24) spaced apart and adjacent opposites sides of the apparatus (10).

4. Security apparatus according to claim 1, characterised in that said interaction means (25) comprises a pair of protuberances (22) and a pair of partition openings (24) spaced apart and adjacent opposite sides of the apparatus (10).

5. Security apparatus according to claim 1 and characterized by a lockable door through which the delivered product or products (30) can be removed from the apparatus (10), the said door being unlockable by a key or by an alpha and/or numeric code operable directly on the door or on a padlock securing the door and a doorframe portion of the apparatus.

6. Security apparatus according to claim 5, characterized in that the said door is located below the entrance opening (18).

7. Security apparatus according to claim 5, characterized in that the said door is located in a side of the apparatus or opposite the entrance opening (18).

8. Security apparatus according to claim 7, characterized in that the door has a height permitting access, when the door is open, to both upper and lower chambers (14, 16).

9. Security apparatus (10) for the secure receipt and retention of articles (30) delivered thereto, said security apparatus (10) comprising a housing (12) having a plurality of sides at angles to one another, the housing being separated into an upper chamber (14) and a lower chamber (16) by a movable partition (15), characterised in that an entrance opening (18) is provided in one of said sides to the upper chamber (14) for permitting the horizontal passage therethrough of a product (30) to be delivered to the apparatus (10), a pivoted closure member (20) is provided for said entrance opening (18), said movable partition (15) is slidable inwardly and outwardly of the apparatus (10) between respectively a closing position in which it separates the upper and lower chambers (14,16) from one another and an open position in which it permits intercommunication between the upper and lower chambers (14,16), and in that interaction means (25) are provided between the partition (15) and said closure member (20) whereby the closure member (20) can only be moved to open said entrance opening (18) when the partition (15) is in said closing partition, said interaction means (25) comprising at least one protuberance (22) extending at an angle from the closure member (20), and at least one opening (24) in the partition (15) engaged by said at least one protuberance (22).

10. Security apparatus according to claim 9 and characterized by a lockable door through which the delivered product or products (30) can be removed from the apparatus (10), the said door being unlockable by a key or by an alpha and/or numeric code operable directly on the door or on a padlock securing the door and a doorframe portion of the apparatus.

11. Security apparatus according to claim 9, characterised in that said interaction means (25) comprises a pair of protuberances (22) and a pair of partition openings (24) spaced apart and adjacent opposite sides of the apparatus (10).

12. Security apparatus according to claim 11, and characterized by a lockable door through which the delivered product or products (30) can be removed from the apparatus (10), the said door being unlockable by a key or by an alpha and/or numeric code operable directly on the door or on a padlock securing the door and a doorframe portion of the apparatus.

13. Security apparatus (10) for the secure receipt and retention of articles (30) delivered thereto, said security apparatus (10) comprising a housing (12) having a plurality of sides at angles to one another, the housing being separated into an upper chamber (14) and a lower chamber (16) by a movable partition (15), characterised in that an entrance opening (18) is provided in one of said sides to the upper chamber (14) for permitting the horizontal passage therethrough of a product (30) to be delivered to the apparatus (10), a pivoted closure member (20) is provided for said entrance opening (18), said movable partition (15) is slidable inwardly and outwardly of the apparatus (10) between respectively a closing position in which it separates the upper and lower chambers (14,16) from one another and an open position in which it permits intercommunication between the upper and lower chambers (14,16), and in that interaction means (25) are provided between and for direct interengagement by the partition (15) and said closure member (20) whereby the closure member (20) can only be moved to open said entrance opening (18) when the partition (15) is in said closing position.

14. Security apparatus according to claim 13, characterised in that said interaction means (25) comprises at least one protuberance (22) extending at an angle from the closure member (20), and at least one opening (24) in the partition (15) engaged by said at least one protuberance (22).

15. Security apparatus according to claim 13, characterised in that said interaction means (25) comprises a pair of protuberances (22) and a pair of partition openings (24) spaced apart and adjacent opposite sides of the apparatus (10).

* * * * *